Nov. 15, 1955
M. P. ROBINSON
2,723,755
WATER TREATING APPARATUS
Filed Oct. 24, 1951
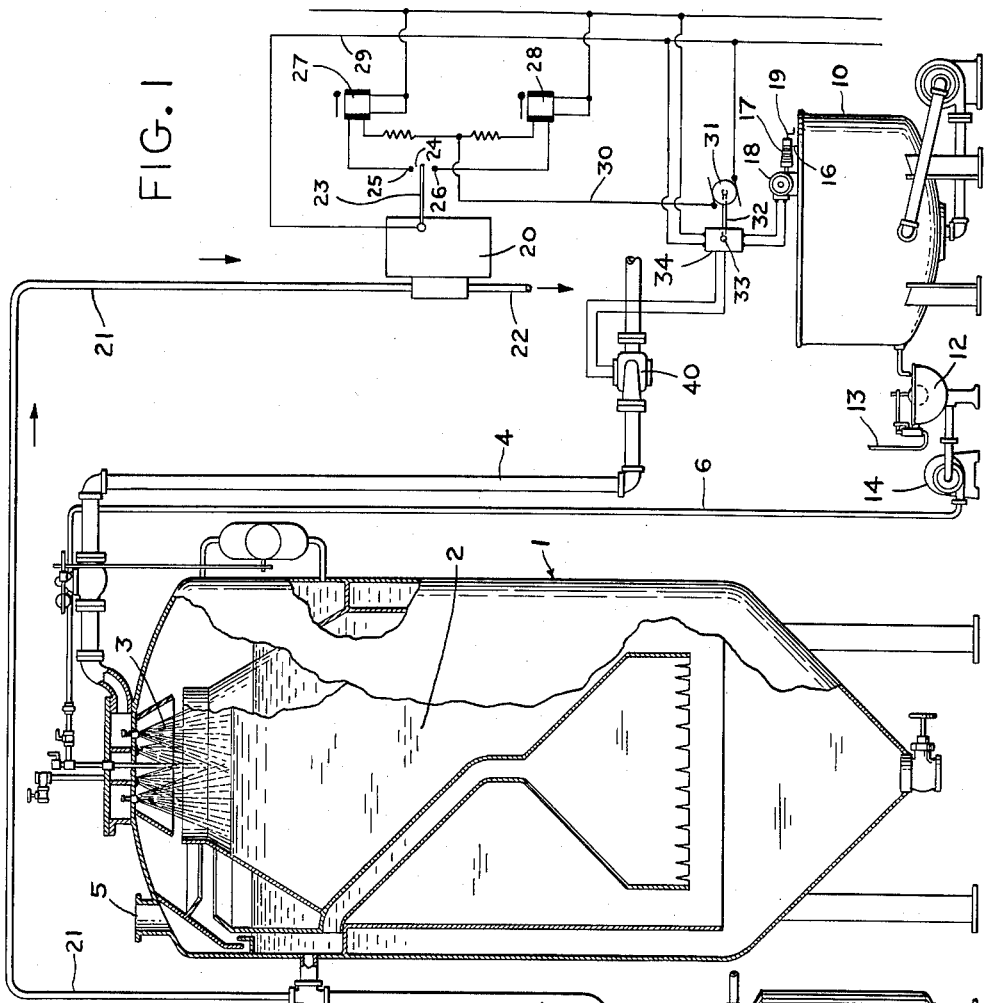
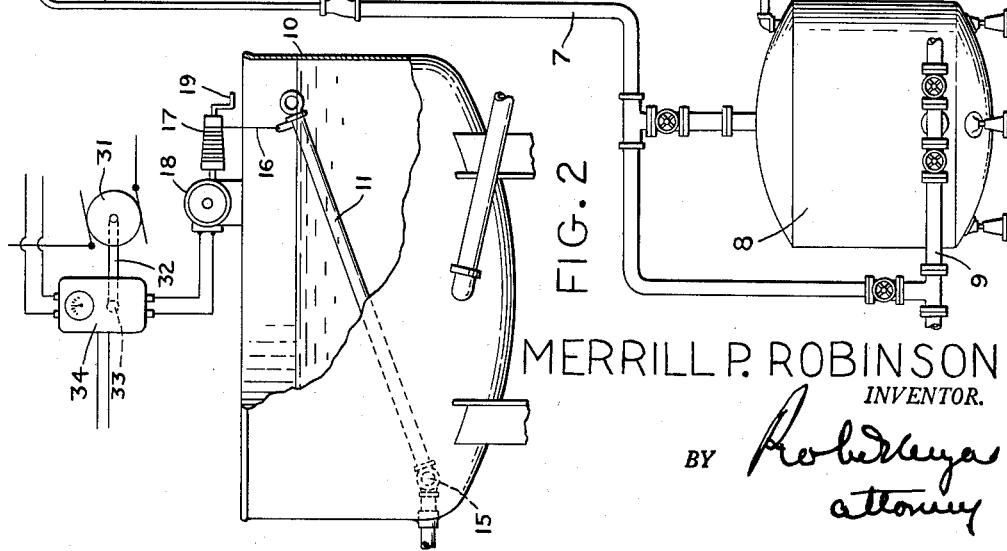
MERRILL P. ROBINSON
INVENTOR.
BY

United States Patent Office 2,723,755
Patented Nov. 15, 1955

2,723,755
WATER TREATING APPARATUS

Merrill P. Robinson, Upper Montclair, N. J., assignor, by mesne assignments, to Cochrane Corporation, Philadelphia, Pa., a corporation of Pennsylvania Application October 24, 1951, Serial No. 252,891

2 Claims. (Cl. 210—40)

This invention relates to water treating apparatus and more particularly to means actuated by the pH value of the treated water for automatically proportioning the amount of chemical feed to the incoming raw water to be treated.

In the well known precipitating or lime soda water softener it is customary to proportion the amount of chemical feed to the incoming raw water by volumetric control. One satisfactory and practical method of volumetric control consists of a measuring meter in the raw water inlet line equipped to transmit electrical impulses at intervals corresponding to the passage through the meter of some definite predetermined quantity of water, together with means actuated by the electrical impulses for feeding the chemical at constant rate for predetermined intervals of time, thus regulating the chemical feed by the quantity or volume of raw water delivered to the softener. In such systems where the character of the raw water varies as to the amount and character of impurities therein, adjustment of the volumetric proportionment of chemical is conveniently provided by means of an adjustable time interval relay for controlling energizing of the motor of a motor driven chemical feeder. Cycling of the relay is initiated by the electrical impulses from a raw water meter and the relay embodies an adjustable feature which provides for manually changing the rate of chemical feed as desired or as is necessary.

With the recent advent of a zeolite which withstands temperatures and caustic alkalinities commonly present in the effluent of precipitating softeners, whether of the cold or hot process types, it is becoming increasingly popular to operate a precipitating softener and a zeolite softener in series. In many circumstances this series method of operation results in very attractive economy because the relatively expensive soda ash may be eliminated and the permanent hardness removed by the zeolite operated on a sodium cycle where relatively cheap sodium chloride is used in the zeolite regenerative process.

The problem of automatic chemical control of the precipitating softener is thus simplified because the soda ash feed is eliminated thereby reducing the problem to lime feeding only, and enabling the increase or decrease in lime feed to be discerned by a pH meter whose sampling electrodes are immersed in water issuing from some point in the system where the chemical mixing and reactions are presumed to be complete.

An object of the present invention is to provide suitable means for automatically adjusting or regulating the lime fed to the precipitating softener whenever a change in the temporary hardness in the raw water results in a treated water pH value above or below the pH value known to be the optimum for proper lime treatment for any particular condition of service.

With these and other objects in view, as may appear from the accompanying specification, the invention consists of various features of construction and combination of parts, which will be first described in connection with the accompanying drawings, showing a water treating apparatus of a preferred form embodying the invention, and the features forming the invention will be specifically pointed out in the claims.

In the drawings:

Figure 1 is a diagrammatic view partly in section and partly in elevation of water treating apparatus constructed in accordance with the present invention.

Figure 2 is a detailed view partly in section and partly in elevation of the chemical feeding mechanism and a part of its control mechanism.

Referring more particularly to the drawings, Figure 1 shows a precipitating water softening apparatus of the hot process type although it is to be understood that the present invention is not necessarily limited to hot process type precipitating softeners.

In the apparatus shown, the precipitating softener 1 includes the usual shell or receptacle 2 into which the raw water is sprayed as shown at 3 being delivered to the sprays through a raw water inlet pipe 4. Steam for heating is admitted into the receptacle or shell 1 through a suitable steam inlet 5 and chemical for the treatment of the water is admitted into the receptacle 1 through a chemical feed pipe 6.

The water, after it has been treated in the precipitating water softening apparatus 1 flows through the outlet pipe 7 into and through a zeolite softener 8 from which it flows through the outlet pipe 9 to service.

The chemical is fed from a chemical containing tank 10 by means of a decanting tube 11. The decanting tube 11 in the construction shown in Figure 1 of the drawings delivers the chemical into a chemical dilution and pump suction box 12 wherein the chemical is diluted by water delivered to the box through a suitable water inlet pipe 13. A chemical pump 14 withdraws the diluted chemical from the box 12 and delivers it through the chemical feed pipe 6 into the receptacle 1.

The decanting tube 11 is pivotally supported as shown at 15 and the feed of the chemical is regulated by the lowering of this decanting tube. A suitable cable 16 is connected to the decanting tube 11 and is wound upon a drum 17. An electric motor 18 is connected through a one-way clutch to the drum 17 for rotating the drum to unwind the cable 16 therefrom for lowering the decanting tube 11. A hand crank 19 is connected to the drum 17 for rotating the drum to wind the cable 16 thereon and raise the decanting tube. A time interval relay 34 supplies current to the motor for a period corresponding to its setting and the relay is actuated by contacting water meter 40.

All the above described apparatus is a general, accepted arrangement or combination of a precipitating water softening apparatus and a zeolite water treating apparatus connected in series and the present invention has to do with means for automatically regulating the amount of chemical fed to the precipitating water treating apparatus 1.

A pH meter 20 of approved construction which may be purchased upon the open market is provided and a sampling pipe 21 is connected to the discharge pipe 7 of the precipitating water treating apparatus 1 or to any other suitable point in the system where the chemical mixing and reactions are presumed to be complete. Water treated by the precipitating water treating apparatus 1 is thus delivered to the pH meter 20 and the electrodes (not shown) of the pH meter 20 are immersed in this water, it flowing through the pH meter 20 and out to waste or any other suitable point through an outlet pipe 22. The pivoted indicating arm 23 of the pH meter which is operated in accordance with the pH value of the water flowing through the pH meter 20 forms a switch arm of an electrical switch structure 24. The electrical switch structure 24 comprises spaced contacts 25 and 26 between which the indicator arm 23 is movable. The contact 25 is connected in the electrical circuit of a recycling relay 27 while the contact 26 is connected in the electrical circuit of a second recycling relay 28. As long as the switch structure 24 is closed, depending on whether the indicator arm 23 is in contact with contact 25 or 26, one or the other of the recycling relays 27 or 28 will automatically reenergize at a predetermined time interval for purposes which will appear clear hereinafter, it being understood that this type relay may be purchased on the open market.

The relays 27 and 28 are connected to a suitable electrical power line indicated at 29 and they are connected with suitable electric wiring shown at 30 to a split series field reversible electric motor 31. The shaft 32 of the motor 31 is connected directly to the adjusting spindle 33 of the time interval electric relay 34 which is in turn connected to the water meter 40 and the source of electrical power indicated at 29. The time interval relay 34 is connected to the motor 18 and controls the energizing or deenergizing of the motor 18 in accordance with its setting which in turn controls the lowering of the chemical decanting tube 11.

In operation, when the pH character of the treated water decreases it causes the indicator arm 23 to contact the contact 25 of the single pole double throw switch structure 24 and close the circuit through the recycling relay 27 causing the energizing of the reversible motor 31. The energizing of the motor 31 through the recycling relay 27 will revolve the adjusting spindle 33 of the time interval relay 34 in the direction to increase the lime feeding interval, that is, in a direction to cause increase in the lowering rate of the decanting tube 11. The rotation of the spindle 33 will be limited by recycling relay 27 to a small increment such as that corresponding to increasing the chemical feed interval by one second. After a predetermined period of time, such as on the order of thirty minutes, the relay 27 will again cycle and deliver current to the motor 31, again increasing the lime feed by the same fraction as the first increase. This momentary application or delivering of electrical current to the motor 31 and increase of delivery of chemical to the precipitating softener 1 is necessary in order to enable the pH meter 20 to register the result of the latest change in the treated water before initiating the next change so as to prevent over-feeding of the chemical.

When the pH of the water has been properly adjusted the indicator arm 23 will move to break the contact with the contact 24 and consequently the time interval relay 34 will maintain its adjusted interval and the chemical feed to the precipitating water treating apparatus 1 will remain the same until another change is signalled by the pH meter 20. When the pH characteristic of the water treated by the precipitating water treating apparatus 1 increases, the indicator arm 23 will move in the opposite direction and contact the contact 26, energizing or causing energizing of the recycling relay 28. The energizing of the recycling relay 28 will apply or deliver electrical current to the other leg of the split field reversible motor 31 causing the motor to rotate in a reverse direction decreasing the setting interval of time interval relay 34 in increments of the order of one second through the medium of the recycling time interval relay 28.

It will be understood that the invention is not to be limited to the specific construction or arrangement of parts shown, but that they may be widely modified within the invention defined by the claims.

What is claimed is:

1. The combination with a precipitating type water treating apparatus including means for feeding chemical thereto and an outlet for treated water, of a pH meter having connection with said treated water outlet whereby treated water will contact the electrodes of the pH meter, said pH meter including an indicator arm, an electric motor for adjusting said chemical feeding means to regulate the quantity of chemical fed to the softener, an electrically operated time interval relay for controlling energizing of said motor and including adjustable means for regulating the interval of operation of the relay, a split field reversible motor connected to said adjustable means for operating it, and means operated by operation of said pH meter indicator arm for controlling energizing of said reversible motor for predetermined spaced intervals.

2. The combination with a precipitating type water treating apparatus including means for feeding chemical thereto and an outlet for treated water, of a pH meter having connection with said treated water outlet whereby treated water will contact the electrodes of the pH meter, said pH meter including an indicator arm, an electric motor for adjusting said chemical feeding means to regulate the quantity of chemical fed to the softener, and electrically operated time interval relay for controlling energizing of said motor and including adjustable means for regulating the interval of operation of the relay, a reversible motor connected to said adjustable means for operating it, a switch controlling energizing of said reversible motor, said indicator arm forming the switch arm of said switch and operable by the pH meter to open or close a circuit through the reversible motor, and recycling means in said circuit for energizing said motor over predetermined spaced time intervals when said switch is closed.

References Cited in the file of this patent

UNITED STATES PATENTS

| | | |
|---|---|---|
| 1,450,023 | Edelman | Mar. 27, 1923 |
| 1,944,803 | Ornstein | Jan. 23, 1934 |
| 2,209,487 | Wagner | July 30, 1940 |
| 2,287,284 | Behrman | June 23, 1942 |
| 2,355,561 | Robinson | Aug. 8, 1944 |
| 2,471,213 | Higgins | May 24, 1949 |
| 2,483,672 | Robinson | Oct. 4, 1949 |
| 2,528,613 | Sebald | Nov. 7, 1950 |
| 2,559,090 | Potter | July 3, 1951 |

OTHER REFERENCES

Feller: "Fundamentals of Feedwater Treatment," Power, vol. 91, No. 8, December 1947. Copy in Library; pages (827) 77 and (828) 78 relied on.